Patented July 7, 1925.

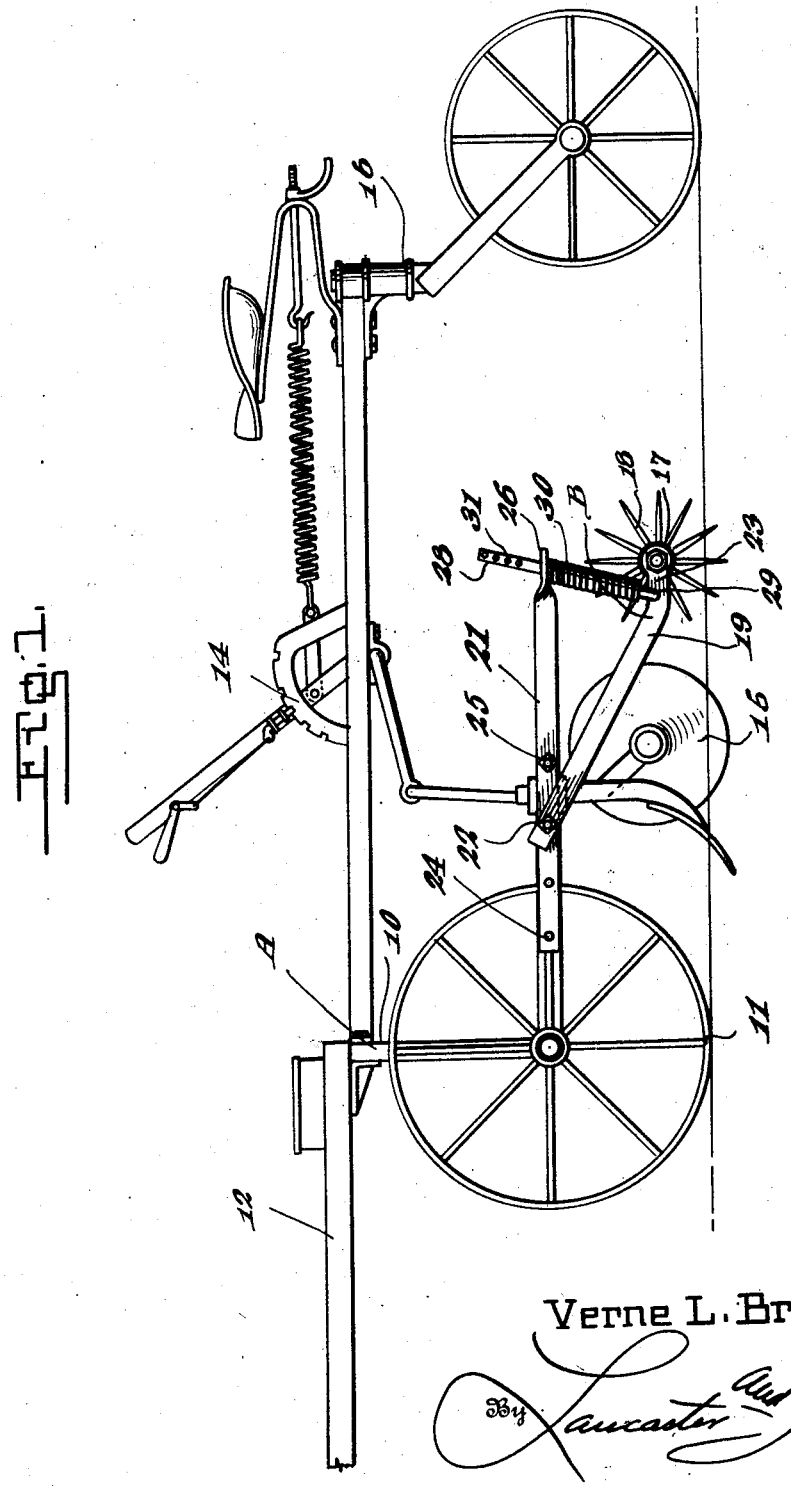

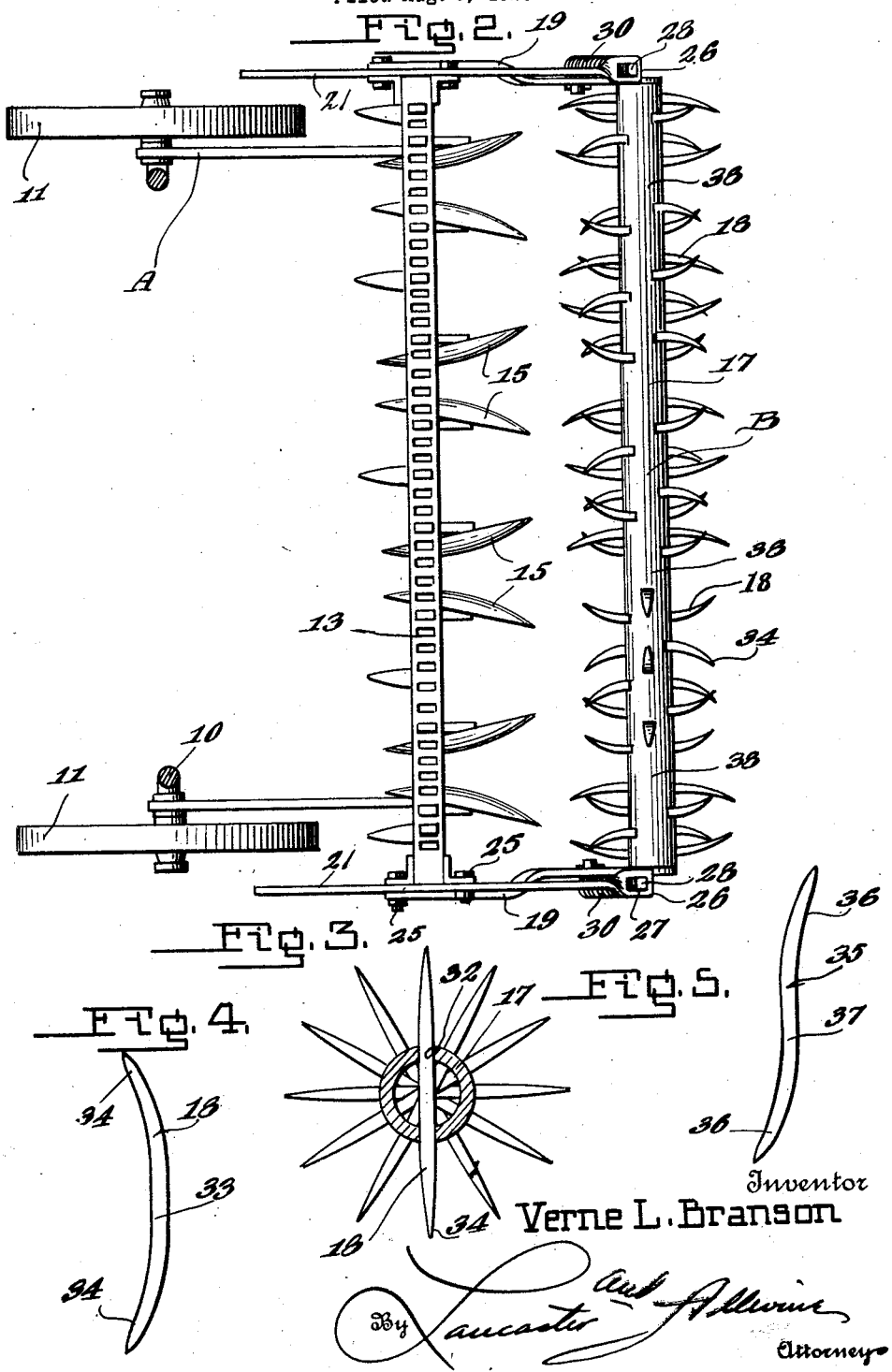

1,544,632

UNITED STATES PATENT OFFICE.

VERNE L. BRANSON, OF LEXINGTON, NEBRASKA.

HARROW ATTACHMENT FOR CULTIVATORS.

Application filed August 3, 1920. Serial No. 400,976.

*To all whom it may concern:*

Be it known that I, VERNE L. BRANSON, a citizen of the United States, residing at Lexington, in the county of Dawson and State of Nebraska, have invented certain new and useful Improvements in Harrow Attachments for Cultivators, of which the following is a specification.

This invention relates to cultivator attachments and the primary object of the invention is to provide an improved harrow attachment for beet cultivators so that the ground intermediate the rows may be completely worked and pulverized.

A further object of the invention is the provision of an improved rotary harrow for beet cultivators which is so constructed that the weeds will be effectively dug up and their roots upturned to the sun and air.

A further object of the invention is to provide an improved means for connecting the harrow to the cultivator so that the harrow teeth will be disposed in proper relation to the cultivator discs or blades.

A still further object of this invention is to provide an improved harrow attachment for cultivators of the above character which is durable and efficient in use, one that will be simple and easy to manufacture and which can be readily incorporated with the ordinary type of beet cultivator.

With these and other objects in view, the invention consists in the novel construction, arrangement and formation of parts as will be hereinafter more specifically described, claimed and illustrated in the accompanying drawings, forming a part of this specification, in which drawings:

Figure 1 is a side elevation of a beet cultivator showing the improved harrow attachment connected thereto.

Figure 2 is a fragmentary plan view partly in section of a beet cultivator showing the improved harrow attachment connected thereto.

Figure 3 is a transverse section through the harrow cylinder.

Figure 4 is a detail elevation of one of the harrow teeth, and

Figure 5 is a detail elevation of a modified form of harrow tooth.

Referring to the drawings in detail, wherein similar reference characters designate corresponding parts throughout the several views, the letter A indicates a beet cultivator and B the improved harrow attachment therefor.

The beet cultivator A is of the ordinary or any preferred style or make and includes the arch axle 10 having the ground supporting wheels 11 mounted thereon. The arch axle 10 carries the draft beam 12 and supports the cultivator beam 13 for the cultivator discs 15. The beam 13 is adapted to be raised and lowered in the ordinary manner by a lever and pawl mechanism 14. The cultivator is also provided with the usual riding attachment 16. The cultivator discs 15 are used in pairs and as shown the cultivator is adapted to be used to cultivate four rows of beets at a time. While a disc cultivator has been shown it is to be understood that the ordinary type of blade cultivator may be used with the attachment if so desired.

The improved cultivator attachment B includes the harrow cylinder 17, which carries the harrow teeth 18. The cylinder 17 may be made of piping or any preferred material and the terminals thereof carry stub shafts which are rotatably carried by the rear terminals of the depending arms 19 which form a part of the harrow frame. The harrow frame also includes a pair of spaced beams 21 which are adapted to be placed on the opposite sides of the cultivator beam 13. The upper terminals of the arms 19 are adapted to be pivotally secured to the side beams 21 by means of pivots 22 and it can be seen that by moving the pivots 22 the harrow cylinder may be moved closer or further away from the discs 15 as may be desired. It also can be seen that the arms 19 themselves may be provided with a plurality of openings so that the cylinder 17 can be adjusted toward and away from the discs. The rear terminals of the arms 19 are provided with angular bent portions 23 which serve as supports for the stub shafts of the harrow cylinder 17.

The inner terminals of the side beams 21 are provided with two pairs of spaced openings 24 and either one of the pairs of openings is adapted to receive bolts 25 which form means for attaching the side beams 21 to the cultivator beam 13. It can be seen that either one of the pairs of openings 24 may be used and may serve as means to permit adjustment of the beams 21 in relation to the cultivator beam 13 so as to move the cylinder 17 toward or away from the discs 15 as may be desired. One of the bolts 25 forms the pivot for the arms 19. The rear terminals of the side beams 21 are provided with right angular twisted portions to provide feet 26 and these feet are provided with slots 27 for slidably receiving the rods 28. The lower terminals of these rods 28 are pivotally connected as at 29 to the angular extending portion 23 of the arms 19. Tension springs 30 are coiled around the rods 28. These springs are confined between the arms 19 and the feet 26 and serve as means to normally hold the harrow teeth 18 in engagement with the surface of the ground. The upper terminals of the rods 28 are provided with a plurality of spaced apertures 31 any one of which is adapted to receive a pin so as to limit the sliding movement of the rod within the slots 27.

The cylinder 17 is provided with a plurality of pairs of diametrically opposed openings 32 for the reception of the harrow teeth 18 and it can be seen that these harrow teeth extend entirely through the cylinder. Each of the harrow teeth is double ended and includes the straight body portion 33 and the arcuately curved terminals 34 which are pointed. The pairs of openings 32 are arranged in spiral formation on the cylinder 17 so that the teeth 18 will project radially therefrom at all angles. It can be seen from the construction of the teeth that the teeth are first inserted into the cylinders and the terminals are then bent arcuately.

If so desired a modified form of tooth may be used with the cylinder and this form of harrow tooth is clearly illustrated in Figure 5 of the drawings, and is designated by the numeral 35. This tooth 35 includes the straight body portion 37 and the oppositely bent arcuate terminals 36 which are sharpened.

These teeth are also arranged on the cylinder in such manner that the spaces 38 will be formed thereon directly in rear of the pairs of discs 15 so that the teeth will not interfere with the growing beet plants.

It also has been found that the teeth will be more effective if the same are arranged in pairs with their terminals pointing toward each other.

In operation of the improved harrow attachment B the same is connected to the cultivator with the cylinders 17 thereof in any desired relation to the discs 15 and the cultivator is then driven over the field in the usual manner. The teeth 18 will effectively engage and work the ground intermediate the rows and will break up all clods and pulverize the earth and uproot all weeds and turn the roots thereof to the sun. This forms an effective means for working the ground and is a labor saving device and great success can be had with the use of the same.

It also is to be understood that the harrow attachment may be used with the cultivator simply for harrowing purposes and all of the discs or cultivator blades can be removed from the device.

Changes in details may be made without departing from the spirit or scope of this invention; but,

I claim:

1. In a ground working implement, the combination with a wheeled frame including a transverse beam, and means for raising and lowering the beam, of a device arranged in the rear of the transverse beam including a pair of rigid side beams secured to the transverse beam for movement therewith, means for permitting adjusting movement of the side beams on the transverse beam, a pair of arms hingedly connected to the side beams, spring means interposed between the arms and side beams, a rotatable cylinder carried by the side arms, and a plurality of spaced sets of harrow teeth carried by the cylinder for working the ground in rear of the transverse beam.

2. In a ground working implement, the combination with an adjustable beam, of a device arranged in rear of the beam including a pair of side beams, means adjustably connecting the side beams with the adjustable beam, a pair of side arms hingedly connected at their upper ends to the side beams, a cylinder rotatably carried by the lower ends of the side arms, hinged rods carried by the side arms and slidably connected to the rear terminals of the side beams, spring means coiled around said rods and interposed between the arms and side beams, and a plurality of harrow teeth carried by the cylinder.

3. In a ground working implement, a main frame including a cross beam, side beams secured to said cross beam, arms pivotally connected with the side beams and extending rearwardly and downwardly therefrom, rods carried by said arms and extending upwardly therefrom and slidably engaged with said side beams, springs about said rods between the arms and side beams to yieldably hold the arms against upward movement, and ground working means rotatably mounted between the free ends of said arms.

VERNE L. BRANSON.